United States Patent
Popov et al.

(10) Patent No.: US 7,202,996 B2
(45) Date of Patent: Apr. 10, 2007

(54) OPTICAL AMPLIFIER

(75) Inventors: Sergei Popov, Årsta (SE); Evgeny Vanin, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 10/487,032

(22) PCT Filed: Aug. 16, 2001

(86) PCT No.: PCT/SE01/01763

§ 371 (c)(1),
(2), (4) Date: Feb. 17, 2004

(87) PCT Pub. No.: WO03/017537

PCT Pub. Date: Feb. 27, 2003

(65) Prior Publication Data

US 2004/0190121 A1    Sep. 30, 2004

(51) Int. Cl.
*H04B 10/17* (2006.01)
*H04J 14/06* (2006.01)

(52) U.S. Cl. .......... 359/337.11; 359/334; 359/341.41; 398/65

(58) Field of Classification Search ........ 398/152, 398/201, 68, 65; 359/341.41, 337.11
See application file for complete search history.

(56) References Cited

U.S. PATENT DOCUMENTS

| | | | | |
|---|---|---|---|---|
| 3,440,424 A | * | 4/1969 | Buhrer | 398/65 |
| 3,671,747 A | * | 6/1972 | Duguay | 398/65 |
| 3,676,684 A | * | 7/1972 | De Lange | 398/91 |
| 3,752,992 A | * | 8/1973 | Fluhr | 398/65 |
| 5,007,693 A | * | 4/1991 | Yamazaki et al. | 398/79 |
| 5,107,358 A | * | 4/1992 | Hodgkinson et al. | 398/79 |
| 5,111,322 A | * | 5/1992 | Bergano et al. | 398/74 |
| 5,379,142 A | * | 1/1995 | Handa | 398/79 |
| 5,508,839 A | * | 4/1996 | Ono | 359/278 |
| 5,589,969 A | * | 12/1996 | Taga et al. | 398/91 |

(Continued)

FOREIGN PATENT DOCUMENTS

JP    11331093 A    2/2000

(Continued)

OTHER PUBLICATIONS

F. Bruyttre, 0. Audouin, V. Letellier, G. Bassier, and P. Marmier. Demonstration of an Optimal Polarization Scrambler for Long-Haul Optical Amplifier Systems. IEEE Photonics Technology Letters, vol. 6, No. 9, Sep. 1994.*

*Primary Examiner*—Jack Keith
*Assistant Examiner*—Ari M Diacou
(74) *Attorney, Agent, or Firm*—Nixon & Vanderhye P.C.

(57) ABSTRACT

For setting the optical gain of an optical amplifier such as a Raman amplifier that is connected in a wavelength division multiplexing (WDM) system, the gain of the amplifier is made dependent on the states of optical polarizers connected to individual inputs of a WDM multiplexer. The polarizers can be actively controlled by a device connected to sense the output power of the Raman fiber at different wavelengths. For an appropriate control the optical gain can be given any desired shape such as for example a reasonable flatness. The control of the polarization states of the WDM-channels allows for the use of a single wavelength pump source of the amplifier, instead of the conventionally used multiwavelength source.

9 Claims, 3 Drawing Sheets

U.S. PATENT DOCUMENTS

| | | | |
|---|---|---|---|
| 5,596,441 A * | 1/1997 | Sakakibara et al. | 398/205 |
| 5,600,474 A * | 2/1997 | Tomesen et al. | 398/205 |
| 5,608,560 A * | 3/1997 | Abram et al. | 398/185 |
| 5,680,236 A * | 10/1997 | Van Der Tol | 398/79 |
| 5,694,233 A * | 12/1997 | Wu et al. | 398/49 |
| 5,724,165 A * | 3/1998 | Wu | 398/55 |
| 5,808,768 A * | 9/1998 | Tadakuma et al. | 398/184 |
| 5,841,557 A * | 11/1998 | Otsuka et al. | 398/65 |
| 5,867,291 A * | 2/1999 | Wu et al. | 398/49 |
| 5,900,957 A * | 5/1999 | Van Der Tol | 398/54 |
| 5,912,748 A * | 6/1999 | Wu et al. | 398/49 |
| 5,920,413 A * | 7/1999 | Miyakawa et al. | 398/84 |
| 5,930,414 A * | 7/1999 | Fishman et al. | 385/11 |
| 5,946,116 A * | 8/1999 | Wu et al. | 398/55 |
| 5,956,168 A * | 9/1999 | Levinson et al. | 398/41 |
| 6,094,296 A | 7/2000 | Kosaka | |
| 6,175,432 B1 * | 1/2001 | Wu et al. | 398/65 |
| 6,310,720 B1 | 10/2001 | Walker et al. | |
| 6,728,491 B1 * | 4/2004 | Ooi et al. | 398/147 |
| 6,760,532 B1 * | 7/2004 | Livas et al. | 385/140 |
| 6,917,467 B2 * | 7/2005 | Howell et al. | 359/337.13 |
| 7,031,354 B2 * | 4/2006 | Cheng et al. | 372/29.02 |
| 2001/0010585 A1 * | 8/2001 | Nishimura et al. | 359/124 |
| 2002/0176154 A1 * | 11/2002 | Sugaya et al. | 359/334 |

FOREIGN PATENT DOCUMENTS

WO     01/11419 A2     2/2001

* cited by examiner

OPTICAL AMPLIFIER

This application is the U.S. national phase of international application PCT/SE01/01763, filed in English on 16 Aug. 2001, which designated the U.S. The entire contents of this application is incorporated herein by reference.

FIELD OF THE INVENTION

The present invention relates to a method and a device for setting, in particular equalizing or flattening, the frequency dependent gain due to polarization shifts in an optical amplifier, such as a Raman optical amplifier, used in a WDM system.

BACKGROUND

In recent years, the increasing demand for information capacity of optical fiber systems has made telecommunications manufacturers develop methods and devices for in particular wavelength division multiplexing (WDM). For these systems, the signal information is transmitted on distinct channels of optical light. The signal information can comprise a plurality of logical signal channels, and each signal channel may, in turn, include both time division multiplexed (TDM) and space division multiplexed (SDM) components, space division multiplexing (SDM) meaning that separate fibers are used for different parts of a message transferred in a logical channel.

The preferred wavelengths for most telecommunication optical fiber systems are in the infrared part of the spectrum, around 1500 nm, due mostly to the low attenuation and the low signal pulse broadening when transmitting signals on optical fibers in this region, but also because of the availability of suitable light sources and detectors. In particular for WDM, another advantage here is the availability of various types of optical amplifiers. These are necessary since each wavelength channel carries only a small portion of the total power of light propagating in the fiber and thus needs to be amplified to compensate for optical losses in the fiber link, in order to get a sufficient signal-to-noise ratio at the receiver end.

There are various designs of optical amplifiers. The most important ones for telecommunication applications include erbium-doped fiber amplifiers (EDFA), semiconductor optical amplifiers (SOA), Raman amplifiers (RA), and optical parametric amplifiers (OPA). These amplifiers have specific advantages and disadvantages.

Raman amplifiers are of a special interest due to some important features. Such amplifiers differ from the others mentioned above in that the gain thereof is distributed over a given length of the optical fiber used, the Raman fiber. The Raman fiber is connected in series with the ordinary transmission fiber, preferably near the transmitting light source. The power necessary for the amplification is delivered by pumping light from at least one separate pump light source. The maximum value and the shape of the Raman gain depend on the wavelength of the light emitted by the pump light source, rather than on the fiber itself. Usually, injection of pump power takes place near the input end of the Raman fiber, using, e.g., a fiber-optical coupling device. Pump light of different wavelengths from several distinct pump light sources can be injected in parallel in order to achieve a desired shape of the Raman gain, see the published International patent application WO 00/49721. A problem with this pumping method is that nonlinear interaction may take place between the various wavelength contributions. Also, the need for several pump light source and the intricate control thereof make such amplifiers complicated and costly.

BRIEF SUMMARY

It is an object of the present invention to provide a method of setting, in particular flattening, the gain of an optical amplifier such as a Raman amplifier and particularly to provide a reduction of the wavelength dependency of an optical amplifier used in a WDM system.

The above object is achieved by controlling, in a suitable way the optical polarization states of the various channels at the input of a WDM system to give a desired gain curve. This allows for using a single pump source providing light of only one wavelength, instead of a multitude of pump light sources providing light of different wavelengths that is controlled as to its power, or a multiwavelength pump source, in which the light of each wavelength is controlled individually as to its amplitude. The use of a single wavelength pump source is also advantageous, because many different pump wavelengths may create non-linear interaction between the pump contributions. The method of controlling the input polarization states also makes the optical amplifier that thereby obtains the desired gain robust and relatively uncomplicated. Due to the fact that only a single pump light source is required, the amplifier has also a relatively small cost.

Using the control of the input polarization states the gain can be controlled to have any predetermined shape within two maximum and minimum shapes. In this way, e.g. the gain tilt due to polarization dependent losses may be compensated for over the whole optical link in which the optical amplifier is connected.

BRIEF DESCRIPTION OF THE DRAWINGS

Embodiments of the present invention will now be described by way of example, with reference to the accompanying drawings, in which.

DETAILED DESCRIPTION

In the following description, a Raman amplifier is used as a typical example of an amplifier for which the method can be used. For other amplifiers having a similar behaviour comprising a gain dependent on the polarization states of the different amplified channels, the same method can obviously also be used.

Figure 1:
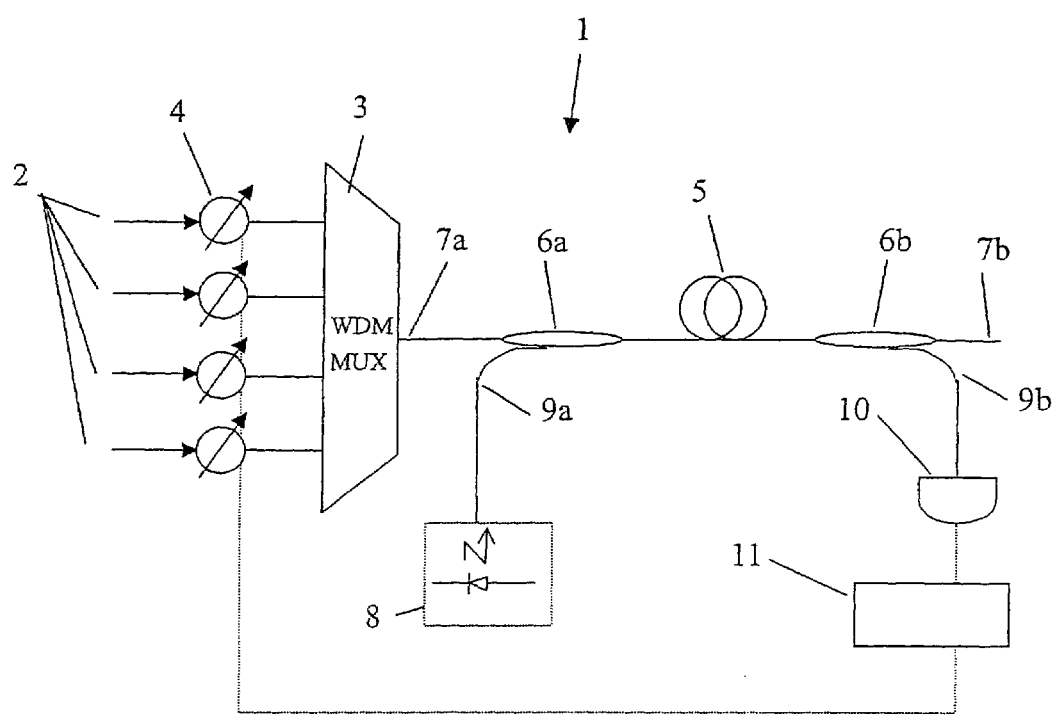
FIG. 1 is a schematic picture of a Raman amplifier.

FIG. 1 is a schematic diagram showing an actively controlled Raman amplifier 1 connected at the input side of a WDM system. A plurality of input fibers 2, each carrying light signals of an individual wavelength channel, are connected to the input terminal of a WDM multiplexer (MUX) 3. The light of each wavelength channel entering the multiplexer 3 is controlled as to its optical polarization state by a polarization controlling unit 4. The output terminal of the (WDM) MUX 3 is connected to the Raman fiber 5. Two optical couplers are connected in the Raman fiber 5, one 6a near the input end 7a thereof and one 6b near the output end 7b thereof Typically, such couplers may consist of two fibers fused together. To one of the input terminals 9a of the input end coupler 6a is an optical pump source 8 connected, injecting single wavelength light. A multiple wavelength pump source is not needed because the corresponding effect for the system as a whole is achieved by using the plurality of polarizers 4, as will be described hereinafter. One of the output terminals 9b of output end coupler 6b is connected to a channel power monitoring device 10 consisting of an array of optical sensor elements, each sensor element measuring the power of a specific channel wavelength, the power received in each element being converted to a corresponding electrical signal. After analog/digital conversion each signal is further processed by an electronic control unit 11 providing control signals fed back to control each of the elements of the array obtained in the cases where the pumping signals having orthogonal and parallel polarizations respectively in relation to the polarization of the light of polarizers 4.

Figure 2:
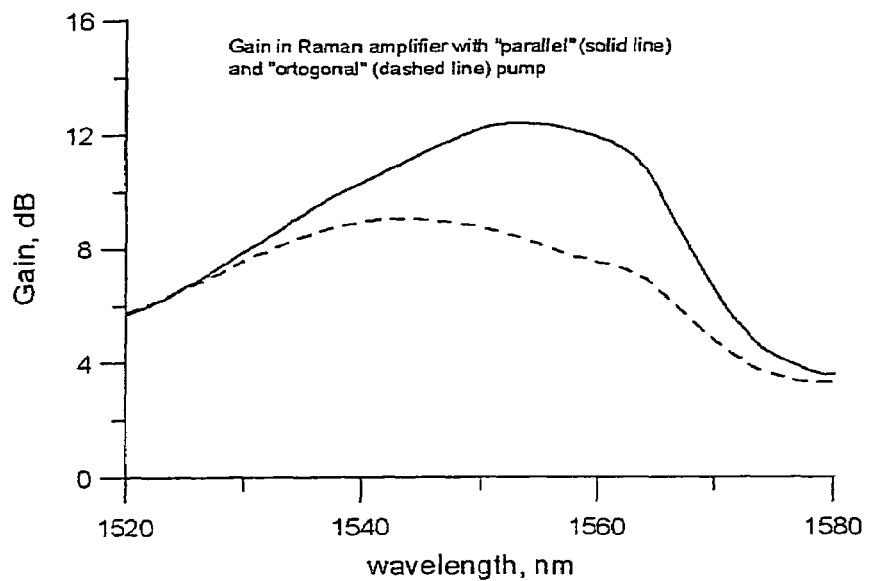
FIG. 2 is a diagram showing the maximum (solid line) and minimum (dashed line) Raman gain profiles around a wavelength of 1555 nm.
Figure 3:
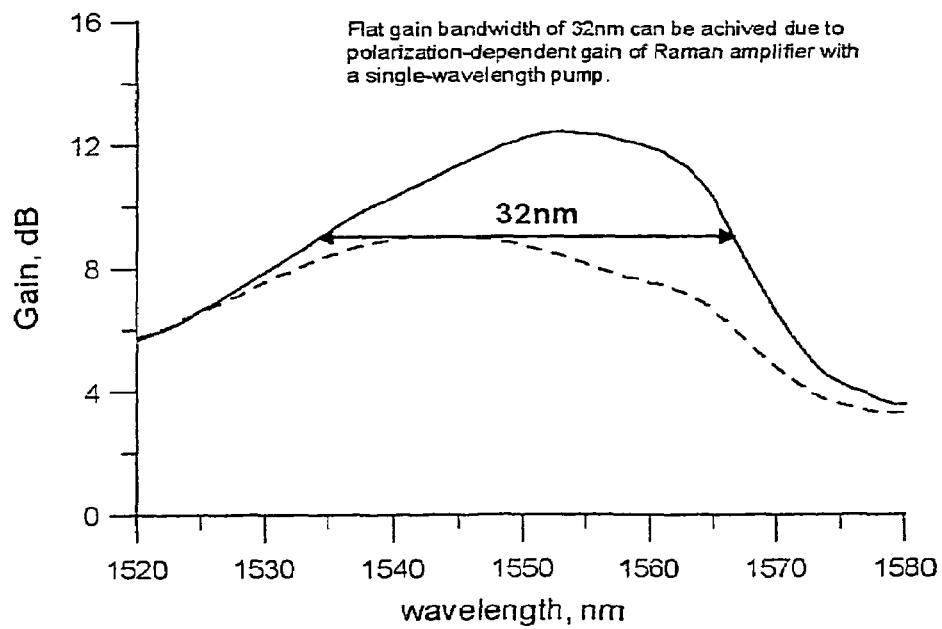
FIG. 3 is a diagram showing the flattening of the Raman gain over a bandwidth of 32 nm.
Figure 4:
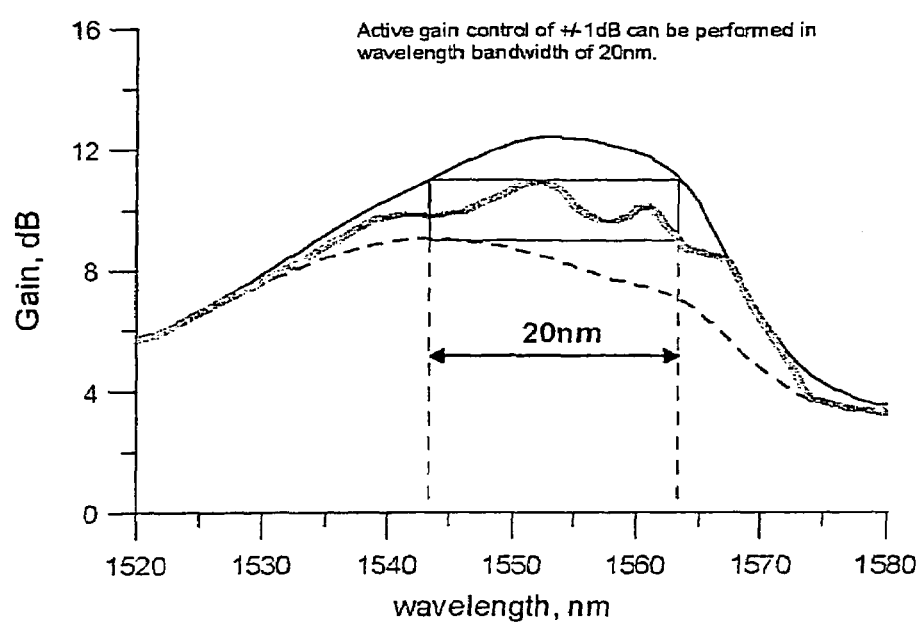
FIG. 4 is a diagram showing the actively controllable change of Raman gain within the maximum and the minimum gains.

A method of controlling the polarizers 4 in order to achieve a predetermined gain curve such as a flattening of the gain obtained at the output end of the Raman fiber will now be illustrated by means of the exemplary diagrams of FIGS. 2–4. The dashed curve of FIG. 2 thus shows the minimum gain and the solid curve shows the maximum gain for light propagating through a Raman fiber and amplified by light from a pump light source as a function of the wavelength of the amplified light in a typical case for a wavelength band located about a center wavelength of 1555 nm. The minimum and the maximum gains are being amplified. In a real case the gain will be somewhere in between these curves due to statistically varying properties of the Raman fiber. Thus it can be generally seen that the gain as measured at the output end 7b of the Raman fiber depends on the wavelength of the amplified light Also, the gain depends on the power and polarization state of the input light that is amplified in the Raman fiber.

In the diagram of FIG. 3 a most favorable value of flattened gain in a Raman fiber is illustrated by the horisontal solid line, this value being equal to the peak value of minimum gain curve. For this gain value a maximum flattened bandwidth of 32 nm could be achieved. This case can be obtained by an individual, appropriate control of the channel polarizers 4.

An extension of the flattening control concept may be carried out, as illustrated by FIG. 4. The thick middle line of FIG. 4 having an irregular shape illustrates some desirable shape of the gain in the Raman fiber and is located between the maximum and the minimum gain curves. By an appropriate individual control of the channel polarizers 4 any shape of the gain as function of the wavelength can be actually obtained within the constraints. In particular, this includes flattened gain shapes having a higher gain but having smaller bandwidths than that illustrated in FIG. 3. Another possibility is the compensation of gain tilts due to wavelength dependent polarization losses over e.g. the optical link connected to the output end 7b of The Raman fiber. Furthermore, in combination with chromatic dispersion compensation in fibers of DCF type the method described herein of adapting the gain in a Raman amplifier with wavelength may be very useful.

A general control scheme executed by the control unit 11 can be as follows. The control unit 11 sends control signals to the polarizers 4 for adjusting the polarization of the light in the channels. The signals output from the elements of the optical sensor 10 representing the power in the channels are compared to the desired gain in the channels, while adjusting the corresponding elements of the array of polarizers 4 in small increments. When the desired gain has been reached for a channel, the adjustment of the polarizer for this channel is stopped.

A control scheme executed by the control unit 11 for setting the flattened gain as illustrated by the solid line in FIG. 3 can be as follows. The first task is to find a minimum curve similar to that shown in FIG. 3. Thus, the control unit 11 sends control signals to the polarizers 4 for adjusting the polarization of the light in the channels to obtain the minimum gain value for each channel, i.e. the minimum power level of the channel for changing polarization states of the respective input signal. Hence, the signals output from the elements of the optical sensor 10 representing the power in the channels are evaluated and stored, while adjusting the corresponding elements of the array of polarizers 4 in small increments. If the power increases when rotating the polarization by one increment in one direction, in the next trial a control signal having a value is produced rotating the polarization by the same step but in the opposite direction. On the other hand, if the power decreases, the rotation direction when changing the polarization state is maintained. This procedure is repeated for each channel until a state is achieved in which an adjustment of the polarization in either direction gives no further change or gives an increased gain. The minimum value of the power is then represented by the actual signal from the corresponding element of the channel sensor 10. Thereupon the different stored values representing the minimum power levels for the amplified light of all WDM channels are evaluated and the maximum or peak value and the wavelength channel for which it is obtained are determined.

The next task is to adjust the gain in the WDM channels or more specifically the power level, as observed at the output end of Raman fiber 5, to the level of the determined peak value for as many channels as possible which is the gain flattening procedure. Then, the stored values of the detected power levels can be evaluated again and for some channels, the correct polarization state to achieve a gain equal to the determined peak value can be directly set as indicated by the stored values. For other channels, the adjustment method is continued, i.e. the signal representing the optical power output from the respective elements of the optical sensor 10 is evaluated, again while adjusting the corresponding polarizer elements 4 in small increments until the absolute difference between the determined peak value and the read power level reaches a minimum. If the absolute difference increases for rotating the polarization in one direction, the direction is changed for the next rotary increment, and if the difference decreases, the direction when changing the polarization state is maintained. This procedure will continue until no further change in the absolute value of the power difference is observed or until the absolute values thereof increases for rotation of the polarization state in either direction.

The method of applying individual polarizers 4 at each WDM channel input in combination with using a single wavelength pump source 8 has the equivalent effect on the Raman gain profile as by instead using a multiwavelength pump source, where each spectrum line contribution is controlled as to its polarization and amplitude. An advantage of using a single wavelength pump source is that non-linear interaction between different spectrum lines can be avoided.

As has already been mentioned and as should be obvious to anyone skilled in the art, the method described herein comprising control of the polarization states of different wavelength channels input to an optical amplifier can be used in any optical amplifier for which the gain of the optical amplifier for light of each of the wavelengths channels are dependent on the optical polarization state of the light of the respective channel.

The invention claimed is:

1. A Raman amplifier comprising:
   an optically pumped Raman fiber arranged to carry a combined light signal comprising plural wavelength divisional multiplexed (WDM) optical channels;
   an optical multiplexer arranged to receive light of different wavelength channels and to combine the received light to the combined light signal applied to the Raman fiber;
   optical polarizers arranged to control a polarization state of the light of the different wavelength channels as applied to the optical multiplexer;
   a control unit arranged to use optical output power of each wavelength channel as received from an output end of the Raman fiber to control the optical polarizers and thereby obtain a desired gain in the Raman fiber.

2. The Raman amplifier of claim 1, further comprising an array of optical sensors connected at an output end of the Raman fiber arranged to measure the optical output power of each wavelength channel and to provide signals representing measured output power to the control unit.

3. A method of operating a Raman amplifier comprising an optically pumped Raman fiber which carries a combined light signal comprising plural wavelength divisional multiplexed (WDM) optical channels, the method comprising:
   applying optically polarized light of different wavelength channels as the combined light signal to an input the Raman fiber;
   using optical output power of each wavelength channel received from an output end of the Raman fiber to control optical polarization of each wavelength channel as applied to the Raman fiber and thereby obtain an adjusted gain in the Raman fiber.

4. The method of claim 3, wherein the step of using optical output power comprises providing control signals to optical polarizers arranged to control a polarization state of the light of different wavelength channels as applied to an optical multiplexer, the optical multiplexer applying the combined light signal to the input end of the Raman fiber.

5. The method of claim 3, further comprising:
   measuring values of the optical output power in each of said individual ones of the wavelength channels at the output of the Raman fiber; and
   using the measured values for setting the optical polarization of the respective individual ones of the wavelength channels input to the Raman fiber.

6. The method of claim 5, further comprising setting the optical polarization of the wavelength channels input to the Raman fiber to obtain a gain curve of the Raman fiber equal to a predetermined gain curve.

7. The method of claim 5, further comprising setting the optical polarization of the wavelength channels input to the Raman fiber to obtain a gain curve of the Raman fiber equal to a flat gain curve within a wavelength band including a plurality of wavelength channels having adjacent wavelengths.

8. The method of claim 5, wherein the steps of measuring and using the measured values comprise:
   changing the optical polarization of the different channels at a system input and evaluating the corresponding measured values,
   determining a minimum optical output power level for each different channel,
   determining which of the determined minimum output power levels for the channels is a maximum value, and
   setting the optical polarization of the channels to give measured output power levels deviating as little as possible from the maximum value.

9. The method of claim 5, wherein the steps of measuring and using the measured values comprises:
   changing incrementally or continuously the optical polarization of the different channels at the system input; and
   evaluating the corresponding measured values and finally setting the optical polarization of the channels to give measured output power levels deviating as little as possible from adjusted power levels.

* * * * *

UNITED STATES PATENT AND TRADEMARK OFFICE
CERTIFICATE OF CORRECTION

PATENT NO. : 7,202,996 B2
APPLICATION NO. : 10/487032
DATED : April 10, 2007
INVENTOR(S) : Popov et al.

Page 1 of 1

It is certified that error appears in the above-identified patent and that said Letters Patent is hereby corrected as shown below:

In Column 5, Line 31, in Claim 3, after "input" insert -- end --.

In Column 3, Line 35, after "light" insert -- . --.

In Column 3, Line 2, after "thereof" insert -- . --.

Signed and Sealed this

Twentieth Day of May, 2008

JON W. DUDAS
*Director of the United States Patent and Trademark Office*